Sept. 29, 1953  L. SPENCER  2,653,628
MIXING VALVE
Filed Nov. 26, 1946
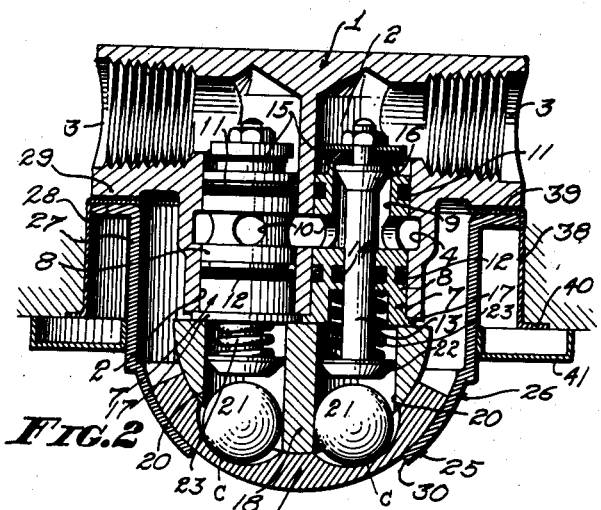
FIG.2
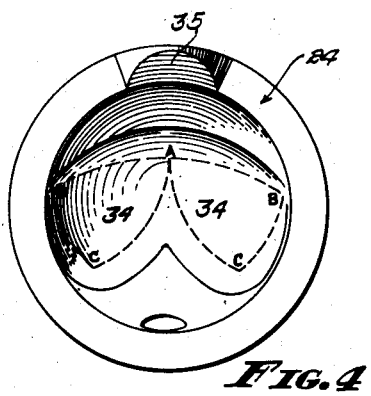
FIG.4
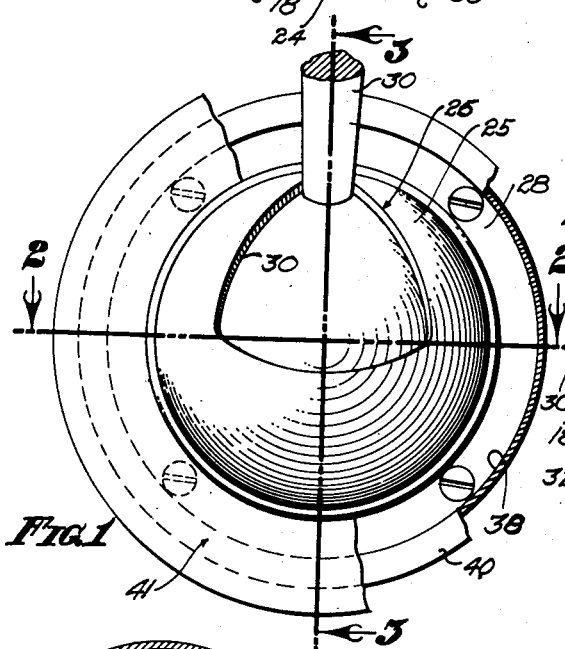
FIG.1
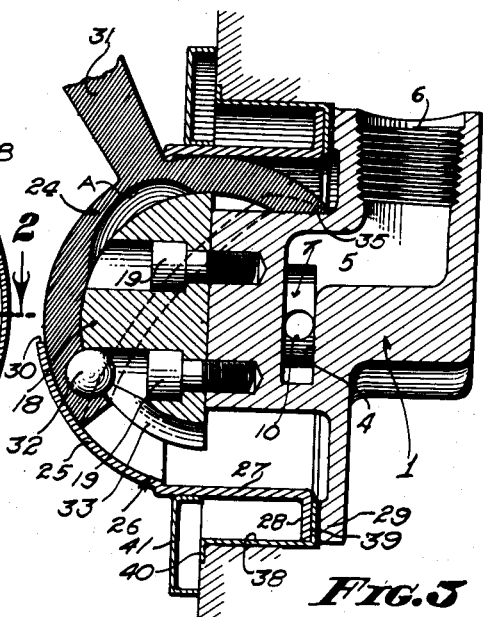
FIG.3
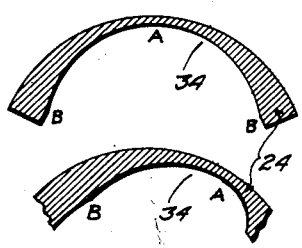
FIG.5
FIG.6
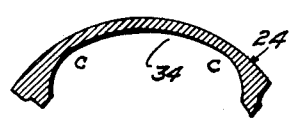
FIG.7
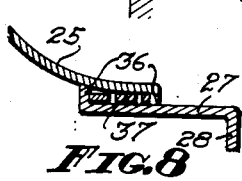
FIG.8
Inventor
Lloyd Spencer Patented Sept. 29, 1953

2,653,628

UNITED STATES PATENT OFFICE 2,653,628

MIXING VALVE

Lloyd Spencer, Hollywood, Calif.

Application November 26, 1946, Serial No. 712,393

10 Claims. (Cl. 137—636)

1

My invention relates to mixing valves particularly designed for mixing hot and cold water and included in the objects of my invention are:

First, to provide a mixing valve which is related to and incorporates some of the advantages of my mixing valve shown and described in my copending application Serial Number 589,768; filed April 23, 1945, now abandoned, and a continuation-in-part application of said abandoned application, said continuation-in-part application bearing Serial Number 335,941; filed February 9, 1953.

Second, to provide a mixing valve wherein a single handle controls two valve members in such a manner that movement of the handle about one axis controls volume and about a transverse axis controls temperature.

Third, to provide a mixing valve of this character which is inherently particularly compact in design, the control means being in the form of a hollow spherical element and the valves being at least partially embraced in the sphere defined by the control means.

Fourth, to provide a mixing valve of this character which is particularly easy to service the control means and valves being removable from the front of the valve structure without disturbing the connections of the valve with the water supply.

With the above and other objects in view, reference is directed to the accompanying drawings, in which:

Figure 1 is a front elevational view of my mixing valve with portions broken away and in section.

Figure 2 is a sectional view in plan taken through 2—2 of Figure 1.

Figure 3 is a sectional view taken through 3—3 of Figure 1.

Figure 4 is a rear elevational view of the control shell.

Figure 5 is a sectional view of the control shell taken along the path B—A—B of Figure 4.

Figure 6 is a fragmentary sectional view of the control shell along the paths B—C of Figure 4.

Figure 7 is a fragmentary sectional view of the control shell along the paths C—A of Figure 4.

Figure 8 is a fragmentary sectional view of a modified form of the retainer shell.

A valve body 1 is provided. The valve body defines a pair of parallel valve bores 2 intersected by suitable supply ports 3, which in the drawings are shown as extending laterally. Forwardly of the supply ports the valve bores 2 are intersected by a common mixing chamber 4

2 which communicates through a passage 5 to an outlet port 6.

Fitted within each valve bore 2 is a valve unit 7. Each valve unit includes a liner 8 which is provided at its inner end with an axial flow passage 9 communicating through ports 10 to the mixing chamber 4. The intake end of the passage is provided with an annular valve seat. The liner is provided with external channels which receive sealing rings 11 and 12, preferably the type known commercially as O rings. Continuing from and coaxially with the flow passage 9 is a valve stem bore which receives a valve stem 13. An O ring or other suitable sealing means 14 surrounds the stem 13. The inner end of the stem is equipped with a valve washer 15 which engages the valve seat to close the flow passage 9.

Within the flow passage adjacent the valve washer 15 is a collar 16 carried by the valve stem and shaped to determine the effective valve area for different positions of the valve washer inwardly from its seat.

The outer end of each valve unit 7 is provided with a flange 17 which bears against the forward end of the valve body and is secured in place by a hemispherical cap and bearing 18 fastened to the valve body by recessed bolts 19. The cap 18 is provided with parallel bores 20 coaxial with the bores 2 and adapted to serve as guides for cam follower balls 21. The adjacent forward or outer ends of the valve stems 13 are provided with heads 22 adapted to be engaged by the balls 21. The valve stems move outwardly, as the valve washer closes, by water pressure assisted by springs 23 positioned behind the heads.

A hemispherical cam shell 24 is adapted to journal over the cap or bearing 18. The cam shell is held in place by the hemispherical forward portion 25 of a retainer shell 26. The retainer shell continues cylindrically as indicated by 27 from its forward portion and is provided at its rearward or inner end with a flange 28. The valve body 1 is provided forwardly of the supply ports 3 and outlet port 5 with a mounting flange 29 to which the flange 28 is secured by screws.

The hemispherical forward portion 25 of the retainer shell is provided with a triangular opening 30 centered on a vertical axis with an apex at the upper extremity of the hemispherical portion adjacent its juncture with the cylindrical portion of the retainer shell. A handle 31 extends from the cam shell 24 into the opening 30.

The cam shell 24 is provided on its inner side at a point 90° from the axis of the handle 31 with a key ball 32 which rides in a vertical key slot or groove 33 provided in the lower portion of the cap 18 centered with respect to the vertical axis of symmetry of the opening 30. The key ball 32 restrains the cam shell 24 against movement about the axis of the handle 31 but permits movement of the cam shell within the limits of movement of the handle 31 in its opening 30 about a first axis passing through the center of the key ball and the center of the cam shell, and a second axis at right angles to said first axis and the axis of said handle.

Such movement of the cam shell causes the cam follower balls 21 to generate triangular areas 34 which correspond to the triangular opening 30. These areas are shaped to form cam areas. As shown in Figures 5, 6 and 7, points B of the cam areas are on the normal inner surface of the cam shell. Points A and C and the paths connecting them occupy a maximum depth in the cam shell. The cam areas thus slope forwardly or into the cam shell from points B to points A and C; that is, the cam areas are formed in effect by tilting the triangular areas forwardly about axes passing through points B, substantially parallel to corresponding lines A—C. The effect of this cam arrangement is, that when one cam follower ball travels in path C—A, the other travels in path C—B. This is accomplished when the handle 31 is moved down either side of the opening 30. The cam follower ball moving in path C—B gradually opens the corresponding valve unit whereas the other cam follower valve remains clear of its valve unit; thus either the hot or cold line is opened. Movement of the handle horizontally between the sides of the opening causes the cam follower balls to move between corresponding points on paths C—A and paths C—B so that as one valve is closed the other is opened.

It should be observed that the key ball need not be exactly 90° from the axis of the handle and that the cam areas may depart in contour a nominal amount from true spherical triangles. The precise contours of the cam areas are of course determined by the amount of effective opening of the valves for each unit of axial movement of the valve washers. The effective opening of each valve at any position is itself determined largely by the shape of the collar or pintle 16.

Thus, up or down movement of the handle regulates volume and lateral movement regulates temperature. It will be observed that clearance is provided between the cam follower balls and the valve stems to permit wearing of the valve washers, so that when new washers are installed the initial movement of the valve handle is ineffective.

It is preferred that the valve units be so arranged that the travel which should be allowed for valve washer wear is appreciably less than the valve movement between "off" and "full on"; this may be aided by the throttling collars 16 which increase the axial travel required. For example the cam shell may be designed for a maximum of a ¼ inch of valve travel, of which from 1/16 inch to 3/32 inch may be allowed for valve washer wear.

In order to avoid excessive loading of the retainer shell 26 about the margins of its opening 30, occasioned by engagement with the handle 31, the periphery of the cam shell 24 may be extended and shaped and the valve body 1 may also be shaped to serve as coacting stops, so that the limits of movement of the cam shell is not determined by the opening 30 but by the body 1.

While this arrangement may be employed for all extreme positions of the cam shell, it is particularly desirable to control the "off" position. Consequently, as shown in Figure 3, the cam shell 24 is provided with a lip 35 which engages the valve body as the handle reaches its extreme "off" position.

When the valves are closed and the cam followers clear the valve stems, the cam shell is retained in a given "off" position by friction pressure exerted by the hemispherical portion 25 of the retainer shell 26. In order to provide under all conditions the desired frictional pressure, and to insure the proper concentricity between the hemispherical portion 25 and the cap 18, the hemispherical portion 25 and the cylindrical portion 27 may be arranged to telescope as shown in Figure 8 and be provided with cooperating flanges 36 between which is interposed a spring 37.

The mounting flange 29 formed as a part of the valve body 1 not only supports the cam shell but also carries a mounting ring 38. The ring 38 is in the form of a short cylinder having an internal flange 39 which is interposed between flange 29 and the flange 28. The outer end of the ring 38 is provided with an external flange 40. When the valve is mounted in a wall as shown in Figures 2 and 3, the outer flange 40 defines the intended surface of the completed wall. An escutcheon ring 41 surrounds the cam shell and covers the mounting ring 38.

The arrangement of the mounting flange 29 as a means of support for the cam shell, and the use of the mounting ring 38 are primarily intended to adapt the valve structure for wall mounting or "concealed" mounting. It is recognized, however, that the valve body, and the manner of securing the cam shell will take different forms to meet the various installation conditions; for example if the valve be adapted external or exposed mounting, the valve body and cam shell will be arranged to accommodate the conventional mounting fixtures or adapters, and the cam shell shaped to improve its ornamental aspects.

Many other embodiments of the invention may be resorted to without departing from the spirit of the invention.

I claim:

1. A mixing valve, comprising: a valve body defining a pair of parallel valve bores, fluid inlets communicating with the inner ends of said valve bores, and a common outlet intersecting said valve bores intermediate the ends thereof; valve elements for said valve bores, said valve elements including valve liners defining passages communicating between said inlets and said outlets, and having valve seats at their inner ends, seal rings between said liners and outlet on opposite sides thereof, valve stems reciprocable in said liners, and valve heads at the inner ends of said stems cooperating with said valve seats; means common to said valve elements for securing said valve elements in said valve body, said means defining cam follower bores registering with said valve elements; cam followers in said bores; a cam defining cam areas adapted to traverse said bores for engagement by said cam followers; and means for supporting and limiting movement of said cam to the boundaries of said cam areas.

2. A mixing valve, comprising: a valve body defining a pair of parallel valve bores, fluid inlets communicating with the inner ends of said valve bores, and a common outlet intersecting said valve bores intermediate the ends thereof; valve elements for said valve bores, said valve elements including valve liners defining passages communicating between said inlets and said outlets, and having valve seats at their inner ends, seal rings between said liners and outlet on opposite sides thereof, valve stems reciprocable in said liners, and valve heads at the inner ends of said stems cooperating with said valve seats; a hemispherical cam journal capping said valve body and securing said valve elements therein, said journal having bores registering therewith; cam followers in said bores engageable with said valve elements; and a hemispherical cam capping said journal and including cam areas adapted to traverse said bores for engagement by said cam followers.

3. A mixing valve, comprising: a body structure defining a hollow hemispherical journal cavity; a hollow hemispherical cam shell journalled in said cavity for universal swivelling movement; cooperating pin and groove means in said cam shell and body structure to restrict the extent of swivelling movement of the cam shell; a pair of valve units incorporated in said body member and having separate inlets and a common outlet; a pair of cams formed in the concave side of said cam shell radially outwardly of its spherical surface; a pair of cam followers each engaging one of the cams and operatively connected to one of the valve units to effect opening and closing thereof; and a handle fixed to the convex side of said cam shell whereby said cam shell may be turned in its journal cavity to open either or both of said valve units to any extent within the range of movement provided by said cams.

4. A mixing valve, comprising: a valve structure including a body having inlets and an outlet, reciprocable valve units disposed with their operating ends adjacent and in position to control flow from said inlets to said outlet; a universal journal member having cam follower guide bores registering with the operating ends of said valve units; cam followers in said guide bores and operatively connected with said valve units; a hollow hemispherical control member overlying said journal member for universal swivelling movement thereover about a point center and covering said guide bores; means for limiting said control member to two directions of movement about said point center; means for retaining said control member on said journal member; and cams formed in the concave surface of said control member and movable across said guide bores as said control member is moved on said journal member thereby to engage said cam followers.

5. A mixing valve, comprising: a valve structure including a body having inlets and an outlet, reciprocable valve units disposed with their operating ends adjacent and in position to control flow from said inlets to said outlet; a universal journal member having cam follower guide bores registering with the operating ends of said valve units; cam followers in said guide bores and operatively connected with said valve units; a hollow hemispherical control member overlying said journal member for universal swivelling movement thereover about a point center and covering said guide bores; means for limiting said control member to two directions of movement about said point center; a shell overlying the convex side of said control member to retain said control member on said journal member, said shell having an aperture exposing said control member; a handle extending from the convex side of said control member through said shell; means for limiting said control member to two directions of movement about said point center; and cams recessed into the concave side of said control member, said cams being of generally spherical contour and disposed eccentrically to the concave spherical surface of said control member, said cams being movable across said guide bores as said control member is moved on said journal member thereby to be engaged by said cam followers.

6. A mixing valve, comprising: a valve body defining a pair of valve bores, fluid inlets communicating with the inner ends of said valve bores, and a common outlet intersecting said valve bores intermediate the ends thereof; valve elements for said valve bores, said valve elements including valve liners defining passages communicating between said inlet and said outlets, and having valve seats at the inner ends, seal rings between said liners and outlet on opposite sides thereof, valve stems reciprocable in said liners, and valve heads at the inner ends of said stems cooperating with said valve seats; means for securing said valve elements in said valve body; a universal journal means at the outer ends of said stems; an actuating member fitted in said journal means for universal swivelling movement and confronting said stems; a pair of cams formed on said actuating member; cam followers interposed between said cams and said stems; and a handle fixed to said actuating member whereby said actuating member may be turned in said journal means to open either or both of said valve units to any extent within the range of movement provided by said cams.

7. A mixing valve adapted for installation in a wall, comprising: a valve body including means defining a pair of valve bores communicating between inlets and an outlet, and a mounting flange encircling said means; a mounting ring extending forwardly from said mouting flange, its forward edge adapted to define the surface of a surrounding wall; valve units in said valve bores; a universal journal means having cam follower bores in registry with said valve bores; a hollow hemispherical cam shell overlying said journal member for universal swivelling movement thereon about a center and covering said cam follower bores; means limiting said cam shell to two directions of movement about a common center; cams formed in the concave side of said cam shell and movable across said cam follower bores on swivelling of said cam shell; cam followers operatively interposed between said valve units and cams; and a retainer shell capping said cam shell and extending within said mounting ring for attachment to said mounting flange.

8. A mixing valve adapted for installation in a wall, comprising: a valve body including means defining a pair of valve bores communicating between inlets and an outlet, and a mounting flange encircling said means; a mounting ring extending forwardly from said mouting flange, its forward edge adapted to define the surface of a surrounding wall; valve units in said valve bores; a universal journal means disposed in front of said valve bores and including a retainer shell extending within said mounting ring and secured to said mounting flange; a cam member universally journalled by said journal means; means limiting said cam member to two directions of movement about a common center; a pair of cams set in the surface of said cam member and movable across said valve bores; and a pair of cam followers operatively interposed in said valve bores between said cams and said valve units.

9. An actuating means for a pair of reciprocable elements mounted in substantial parallelism, comprising: a hollow hemispherical cam shell its concave side overlying the ends of said elements; cams of substantially triangular configuration and of varying radial distance from the center of said cam shell set in the concave side of said cam shell and engageable with said reciprocable elements; internal and external journal means defining a hollow hemispherical cavity for said cam shell to confine said cam shell to universal movement about its center; means for restraining said cam shell to two directions of movement about said center; and means confining the extent of movement of said cam shell to the areas of said cams.

10. An actuating means for a pair of reciprocable elements mounted in substantial parallelism, comprising: a hollow hemispherical cam shell its concave side overlying the ends of said elements; cams of substantially triangular configuration and of varying radial distance from the center of said cam shell set in the concave side of said cam shell and engageable with said reciprocable elements; internal and external journal means defining a hollow hemispherical cavity for said cam shell to confine said cam shell to universal movement about its center; a handle for said cam shell extending through said external journal means; means for restraining said cam shell against movement about the axis of said handle; and means confining within the boundaries of said cams the extent of movement of said cam shell about its remaining two directions of movement.

LLOYD SPENCER.

References Cited in the file of this patent
UNITED STATES PATENTS

| Number | Name | Date |
|---|---|---|
| 1,280,616 | Lawler | Oct. 1, 1918 |
| 1,614,437 | Cochran | Jan. 11, 1927 |
| 1,845,627 | Rosewood | Feb. 16, 1932 |
| 2,075,917 | Vorech | Apr. 6, 1937 |
| 2,243,937 | Almond | June 3, 1941 |
| 2,294,702 | Van Der Werff | Sept. 1, 1942 |
| 2,418,360 | Matlack | Apr. 1, 1947 |